May 13, 1969 R. H. OVERCASHIER ET AL 3,443,920
METHOD OF PRODUCING FOAMED GLASS HAVING UNIFORM CELL SIZE
Filed March 17, 1966 Sheet 1 of 2

INVENTORS:
ROBERT H. OVERCASHIER
CHARLES M. SCHLAUDT
STEPHEN A. SHAIN
BY: Osnald H. Wilmore
THEIR ATTORNEY

INVENTORS:
ROBERT H. OVERCASHIER
CHARLES M. SCHLAUDT
STEPHEN A. SHAIN

BY: *Oswald H. Milmore*

THEIR ATTORNEY

United States Patent Office 3,443,920
Patented May 13, 1969

3,443,920
METHOD OF PRODUCING FOAMED GLASS HAVING UNIFORM CELL SIZE
Robert H. Overcashier, Walnut Creek, Calif., Stephen A. Shain, Houston, Tex., and Charles M. Schlaudt, El Cerrito, Calif., assignors to Shell Oil Company, New York, N.Y., a corporation of Delaware
Filed Mar. 17, 1966, Ser. No. 535,242
Int. Cl. C03b *19/08*
U.S. Cl. 65—22  3 Claims

ABSTRACT OF THE DISCLOSURE

A method of forming foamed glass having uniform cell size and distribution formed by admixing raw glass with a blowing agent consisting of barium carbonate or strontium carbonate, heating said mixture under a highly pressurized atmosphere containing $CO_2$, and then reducing said pressure.

---

This invention relates to the manufacture of rigid multicellular glass foam material and to production methods for articles therefrom.

Foamed glass materials are of great value as thermal insulants due to the inherent properties of low thermal conductivity and high resistance to chemical corrosion and fire. However, due to high costs of production or unsatisfactory product properties such materials have not been generally adopted by the industry, which uses principally the more common asbestos, cork, polymer foam or cellulose fibre materials, notwithstanding the failure of such materials to possess one or more of the desired properties.

One prior art mode of manufacturing glass foam has been to mechanically mix the powdered constituents of glass with a decomposable blowing agent such as calcium carbonate and heat the mixture to a point above the sintering point of the glass and above the decomposition point of the blowing agent but below the point of complete fusion for the glass raw materials. To inhibit the expansion of the gas released by the decomposition of the blowing agent, gaseous fluid pressure has been applied to the surface of the glass melt within a melting chamber. Mere inhibition of blowing gas expansion within the glass melt while the temperature of said melt was raised to a level appropriate for a desired melt viscosity level was the fundamental objective in pressurizing the melt chamber atmosphere in this prior art process, and decomposition was not prohibited.

According to another prior art process for manufacturing glass foam, the interstitial gas in the raw glass batch is pressurized in order to increase the amount of gas in solution with the subsequent melt and to retain the said gas in solution until the desired viscosity has been reached. This process includes no blowing agent within the powder constituents however, and relies for cellulation exclusively on solution of the occluded gas filling the voids between the individual powder particles and trapped therein by the fusing of said particles. For the pressures used, only a small amount of such gas may be dispersed throughout the glass melt even under the best conditions of a completely saturated solution. Although it is obvious that greater quantities of gas could be occluded and dissolved in the glass batch by proportionally increasing the pressure, as a practical matter this is not done because of economic factors which limit the pressure capacity of equipment used. Hence, the density of the material produced by this process is usually quite high due to the relatively small amount of gas initially present in the melt under practical circumstances.

According to a third prior art method of producing glass foam, the raw glass constituents are mixed with a composite blowing agent consisting of a reducing agent such as SiC and an oxidizing agent such as $Na_2SO_4$ which react to form a gas. A mechanical mixture of these ingredients is placed in a pan or kiln floor and under the pressure of one atmosphere is heated to a temperature of approximately 1050° C. or slightly below that at which the reducing and oxidizing agents react. The temperature of the batch is held at this temperature for such period as to allow temperature stabilization throughout the batch. Then, the temperature is slowly raised to a point slightly above the reaction temperature of the blowing agent or until a melt viscosity of $10^5$ to $10^7$ poises is reached. Here, the elevated temperature is held at a pressure of about one atmosphere while the blowing agents combine and react to produce gas bubbles throughout the mix. For a batch viscosity of $10^7$ poises the holding period is in the order of 16 hours for a product density of 0.15 to 0.30 g./cc. Although an automated batch process approaching continuous production is possible with this third process it is clear that the capital expenditure for kilns of sufficient size to accommodate the excessive cellulation times at a reasonable production rate is enormous.

Hence, the purpose of this invention is the production of glass foam having uniform cell size and cell distribution over a widely selective range of product density at high and continuous production rates. The glass foam product resulting from this process has utility as structural load-bearing bearing material in addition to the aforedescribed thermal insulation properties.

Briefly, our invention includes the use of a decomposable solid blowing agent such as may be of the alkaline earth carbonate group such as $MgCO_3$, $CaCO_3$, $SrCO_3$ or $BaCO_3$, or of the alkaline earth hydroxide group such as $Mg(OH)_2$, $Ca(OH)_2$, $Sr(OH)_2$ and $Ba(OH)_2$, or of the alkali carbonate group such as $Na_2CO_3$ or $K_2CO_3$, or they may be double carbonates, such as $CaMg(CO_3)_2$ or $Na_2Ca(CO_3)_2$. The blowing agent is mechanically mixed with the raw glass constituents and heated in a highly pressurized atmosphere, such as one containing or consisting of, $CO_2$ in the case of a carbonate blowing agent, and water vapor in the case of a hydroxide blowing agent. When several blowing agents are used together they are preferably of the same type, i.e., all carbonates or all hydroxides. However, it is possible to mix the types and in such a case the pressurized atmosphere gas will necessarily need to be a mixture of $CO_2$ and water vapor. The temperature and pressure are increased in such a manner as to keep the partial pressure (i.e., that portion of the total atmosphere pressure contributed by the atmosphere constituent gas that is of the same species as that produced upon decomposition of the blowing agent) on the mix and subsequent melt above the blowing agent decomposition level until the melt reaches the desired cellulating viscosity level.

Cellulation or foaming of a melt may take place with the melt viscosity as high as $10^{10}$ poises. Greater viscosities inhibit if not prohibit cell growth. Likewise, foaming may readily take place at viscosities at least as low as $10^4$ poise, but cell growth is difficult to control at smaller viscosity values. However, viscosity values of not more than $10^9$ poises nor less than $10^5$ poises are preferred.

Upon satisfaction of the foregoing conditions, the said partial pressure on the melt of the said atmosphere is suddenly reduced, as by extrusion of the melt through a die block into a region of lower pressure or by rapidly venting of the said atmosphere while the temperature of the melt is sustained. Being no longer subject to the confining pressure, the blowing agent decomposes and $CO_2$ or $H_2O$ gas is generated rapidly at uniformly distributed sites throughout the melt by the dissociation reaction of the blowing agent. Also released by the pressure drop is a small amount of gas originally occluded in the raw glass batch and subsequently dissolved therein upon fusion of the glass batch particles. The release of this dissolved gas contributes to the cellulation of the glass melt in a manner similar to that disclosed by the second prior art process described above. The resultant cellulation effect from the release of this dissolved gas is merely cumulative, however, to the above-mentioned cellulation resulting from decomposition of the blowing agent.

Although the product density may be diminished by foaming the melt at a lower viscosity and/or by increasing the percentage of blowing agent originally present in the raw glass batch (or increased by the opposite changes), once the pressure is released the sole remaining density control factor is the sustenation of the material temperature after foaming. Greater densities are achieved by quenching the foam before maximum cell growth. If a very light foam having a very low density of approximately 0.08 g./cc., for example, is desired, the temperature and glass viscosity are held at a suitable level for a longer time so as to allow maximum cellulation and bubble growth.

The invention will now be described in detail with reference to the appended drawings wherein.

Figure 3:
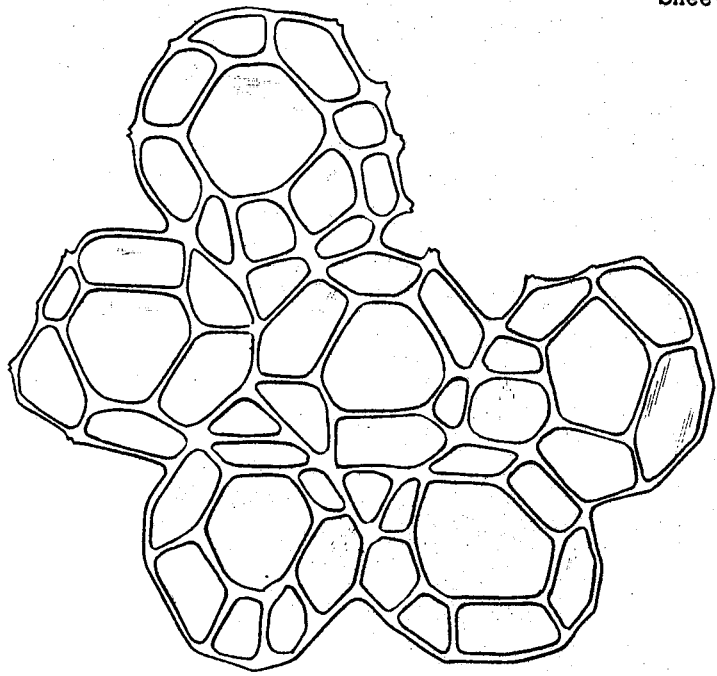
FIGURE 3 illustrates a magnified portion of the foamed glass product derived from our process and shows the geometry and inter-relationships of the respective cells.
Figure 1:
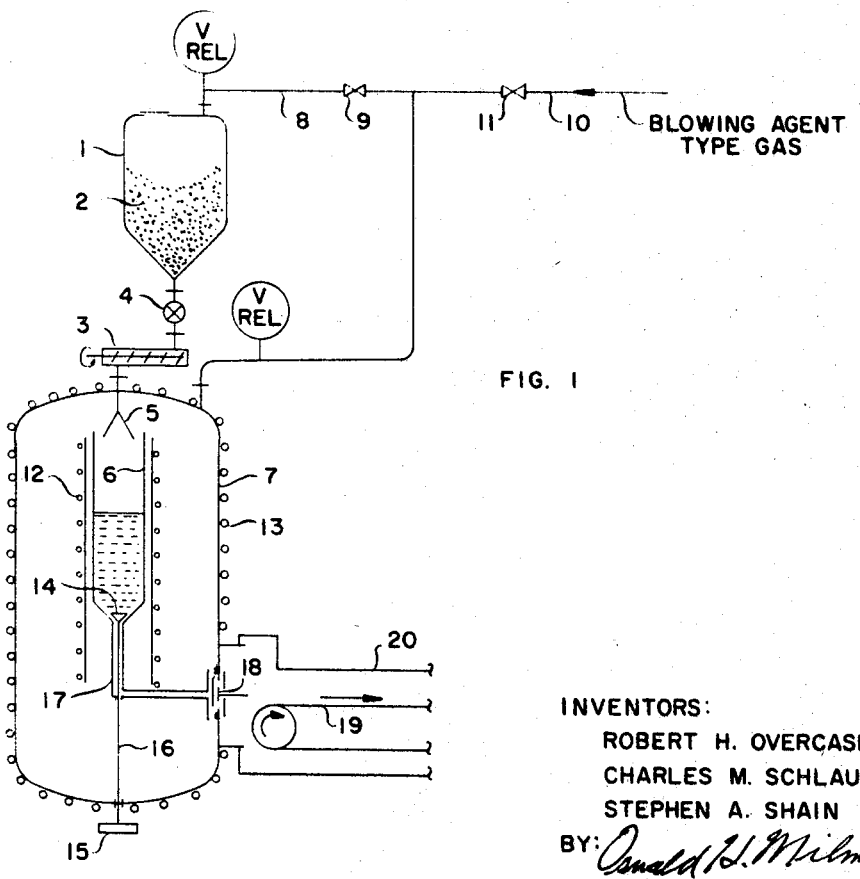
FIGURE 1 is a schematic representation of the melting and extrusion apparatus used in practicing the invention.

The apparatus for practicing our invention, as schematically illustrated in FIGURE 1, includes a feed hopper 1 in which a mixture 2 of siliceous material, such as glass forming powder, and blowing agent is placed. The feed hopper 1 is in conduit communication with a screw conveyor 3. Intermediate to the feed hopper and screw conveyor ends of the conduit is a wide-opening valve 4. The screw conveyor feeds the powder mixture through an inlet conduit 5 that is flared at the bottom into a crucible 6 contained within the main extruder vessel 7. A pressure-equalizing line 8 having a normally open valve 9 connects the top of the main extruder vessel with that of the feed hopper 1 to prevent a pressure differential from impeding the flow of raw glass mixture from the latter to the former. Line 8 also has gas conduit 10 and a normally closed sealing valve 11 connected therewith for introduction of the pressurized atmosphere gas to the interior of extruder vessel 7. Crucible 6 is open-ended to allow pressure equalization between the interior thereof and the surrounding pressurized atmosphere internally of the main pressure vessel 7. Heat is supplied to the crucible 6 by an electrical resistance heater 12. Cooling water is circulated through the coils 13 to preserve the structural strength of main pressure vessel 7.

For discharging the glass melt when it is ready for extrusion, a normally closed valve plug 14 is provided at the apex of the funnel shaped bottom of the crucible 6. The valve plug 14 can be raised by actuator 15 via actuator rod 16. Below the valve plug 14, the crucible 6 joins with a discharge conduit 17 for conducting the liquefied glass to an extrusion die 18. The pressure of the gas atmosphere acting on the surface of the melt in the crucible serves as the driving force for pushing the viscous liquefied glass through the die 18.

It may be desirable to cool the melt slightly as it passes through the discharge conduit and for this purpose natural conduction to the cooler insulant atmosphere surrounding the heater zone has been found to be sufficient. However, should specific circumstances require, obviously the cooling rate may be increased by additional, e.g., convective, means such as cooling coils.

A moving conveyor belt 19 carries the glass from the discharge side of the extrusion die 18 through an annealing tunnel 20. The interior of annealing tunnel 20 is maintained at a low, i.e., atmospheric, pressure.

An example of the use of the afore-described apparatus to yield the desired product is as follows, the use of a carbonate blowing agent being illustrated.

A typical mixture of glass-forming constituents is particulated from boric acid, $H_3BO_3$, silicon dioxide, $SiO_2$, and sodium bicarbonate, $NaHCO_3$ of percentages sufficient such that when dried at 250° C. a mixture of 35% weight $B_2O_3$, 40% weight of $SiO_2$ and 25% weight of $Na_2O$ remains. Subsequent to drying, a 1% weight of $SrCO_3$ is combined as blowing agent with the glass constituent mixture. For admixing, the $SrCO_3$ is prepared in powdered form of, for example, 1–3 micron particle size. The particular particle size chosen is critical only in the relationship borne to the ultimate cell size since each particle serves as a nucleating site and the ultimate cell volume is directly proportional to the weight of $CO_2$ available from each particle. Additional regard should also be given the relationship between particle size of the blowing agent and glass-melt surface tension. At each surface tension level there exists a minimum blowing agent particle size below which bubbles cannot be nucleated as a result of restrictive surface tension forces.

It should be understood that the particular raw glass mixture formulated above is for a relatively low temperature glass for which the dissociation properties of $SrCO_3$ are ideally suited. Should a higher temperature glass be used, the temperature of the glass melt prior to foaming must be increased to the point where the viscosity of the glass melt is in the range to allow cell growth once pressure is reduced. At such a higher temperature, a different blowing agent such as $BaCO_3$ is required if the pressure of the $CO_2$ gas atmosphere is to be kept within allowable structural limits of the main extruder vessel 7 and still prohibit dissociation of the blowing agent at the said higher tempeature.

Figure 2:
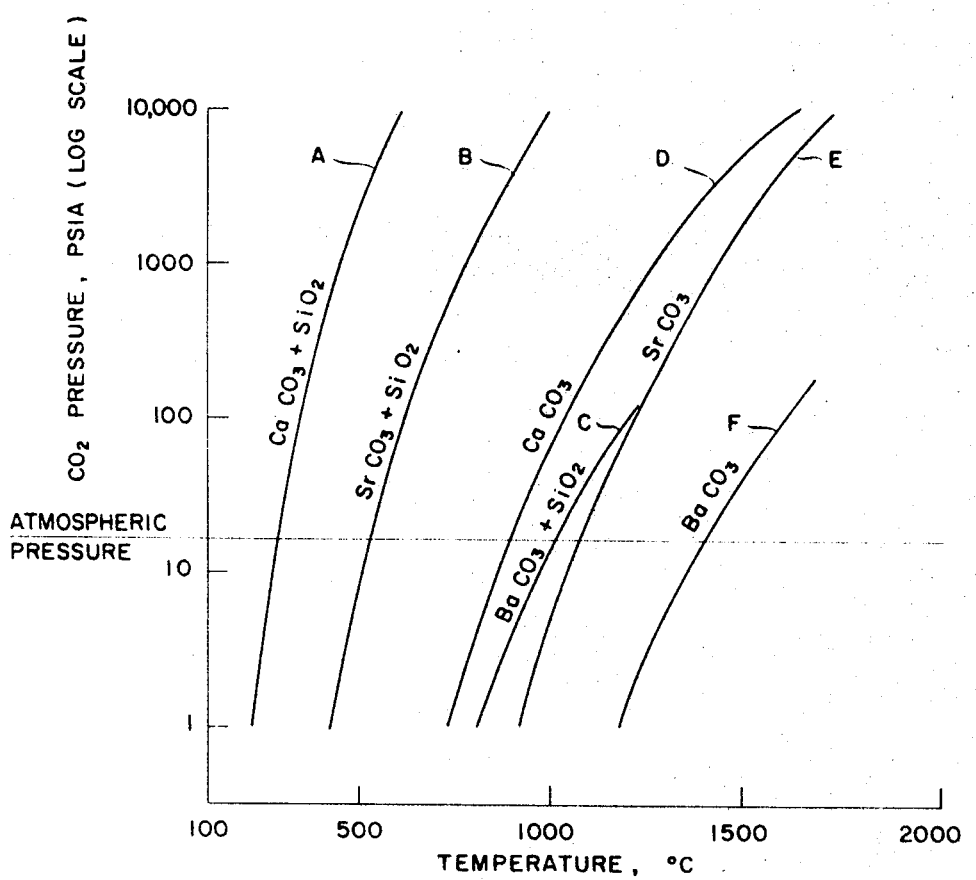
FIGURE 2 is a graph illustrating the relative dissociation properties of several possible blowing agents that may be used in accordance with the invention; plotted as abscissae are temperature values in degrees centigrade, and as ordinates the absolute pressure in pounds per square inch on a log scale. The curves define dissociation pressures at respective temperatures.

For a better understanding of the inter-relationship of glass melt viscosity, temperature and blowing agent decomposition pressure refer to the dissociation curves shown in FIGURE 2. In the first case of a low-temperature glass it is seen that a point having the co-ordinates of 700° C. and 1200 p.s.i.g. is above the $SrCO_3+SiO_2$ curve B. Dissociation of the $SrCO_3$ will be prohibited so long as the pressure remains above the curve for any given temperature. However, if a higher-temperature glass is used, such as one which requires a temperature of 1000° C. to reduce the viscosity to the fining level of $10^3$ poises, it is seen that a $CO_2$ confining pressure in excess of 10,000 p.s.i.a. would be required to prohibit dissociation if the blowing agent were $SrCO_3$. Such pressures are greatly in excess of practical structural limits for the pressure vessels involved. However, by using $BaCO_3$ (curve C) as the blowing agent it will be seen that a $CO_2$ pressure of 18 p.s.i.a. is sufficient to prohibit dissociation of the blowing agent at 1000° C.

The FIGURE 2 curve A represents the dissociation properties of calcium carbonate in combination with silicon dioxide as plotted against temperature and pressure. Curves D, E and F are presented to emphasize the fact that the same three blowing agents of curves A, B and C, calcium carbonate, strontium carbonate and barium carbonate, respectively, behave much differently in isolation from silicon dioxide than when silicon dioxide is present as is the case of curves A, B, and C.

Continuing with the example and again referring to FIGURE 1, the feed hopper 1 is charged with the described mixture of glass raw material and blowing agent from which the mixture is transferred by the screw conveyor 3 to the crucible 6.

Internal to the main pressure vessel 7, $CO_2$ gas is introduced before heating the mixture until the pressure therein reaches the vicinity of 12 p.s.i.g. It is important to note that the melt atmosphere may be composed of a mixture of gases but it is the partial pressure of the blowing agent type gas, in this case $CO_2$, that must exceed the decomposition pressure of said blowing agent at the given temperature.

The mixture is then heated to approximately 700° C. or until the now-fused mass which constitutes the melt has a viscosity of not more than $10^5$ poises nor less than $10^2$ poises. The precise viscosity value is determinative of the length of the time period explained below. Under these temperature and pressure conditions the melt is allowed to become purged of bubbles of undissolved $CO_2$ and other foreign gas originally present in the powdered glass mixture and trapped internally by the fusion thereof. The purging process is called fining. Parenthetically, these gases, $CO_2$ in particular, are technically not of a gaseous nature but are more precisely described as supercritical fluids under the prevailing temperature and pressure conditions. An initial charge may require 30 hours for this fining cycle at a melt viscosity of approximately $10^3$ poises but the process can be continuous thereafter as powdered mixture from the hopper 1 is steadily added to an already-fused melt in the crucible. Under these conditions only the surface of the melt would include entrapped gases and these escape upwards in a relatively short time because they present only a relatively shallow depth through which the gases must pass to escape. A longer fining period is required for a more viscous melt and vice versa. Continuous flow of the melt from the crucible is allowed by properly regulating the opening past the valve plug 14.

It will be understood that at the end of the fining cycle the melt constitutes a completely homogenous fused mass with the $SrCO_3$ dispersed uniformly throughout the melt. No gaseous substance has been generated nor is it present in the melt as a gas phase at this time. Any free $CO_2$ that may be present is completely dissolved.

As the melt flows out of the bottom of the crucible 6 but prior to its exit from the forming die, the temperature is reduced by natural conduction to the cooler insulant atmosphere surrounding the crucible heater 9 to the range of 635°–675° C. or to a melt viscosity level of $10^4$ to $10^{10}$ poises, e.g., $10^6$ poises. Under these conditions the pressure on the melt is suddenly reduced upon passing the die block to 0 p.s.i.g. The confining pressure absent, the compound reacts according to: $SrCO_3 + SiO_2 \rightleftarrows SrSiO_3 + CO_2$. The $CO_2$ forms gas bubbles and the $SrSiO_3$ is left in the glass melt.

As the blowing agent decomposes under the reduced pressure of the melt, minute bubbles are formed simultaneously and uniformly throughout the melt.

As explained previously, these bubbles or cells should be allowed to grow in size until the desired foam density is achieved. For maximum cell growth and minimum foam density the growth period should be one half to five minutes. Furthermore, experience has shown that for uniform expansion throughout the cross-section of the foamed product, the melt should usually be extruded into a temperature region of approximately 100° C. below the melt temperature at the die exit.

Subsequent to foaming, the material may be annealed by any of the known methods to relieve internal stresses.

It may thus be seen from the foregoing description that our process may be used to rapidly and continuously produce glass foam having uniform cell distribution and size. Although the description of our process has been directed to the preferred continuous extrusion embodiment, it should be understood that a batch or intermittent operation is also possible. In such case a measured amount of raw glass and blowing agent mixture is placed in a container or form and subjected to the afore-described pressurization and heating cycles. After the batch has been fined and reduced to the proper cellulation viscosity level of $10^4$ to $10^{10}$ poises, e.g., $10^8$ poises, the pressure is quickly released. Care should be taken, however, not to depressurize the system with such rapidity as to chill the foam (due to adiabatic expansion) and thereby inhibit cell growth. Pressure release over a one to five minute period should be adequate, dependent on volumetric size.

Although we have described our invention with respect to a particular glass compound in conjunction with a particular blowing agent it is to be understood that the same principles would apply to any glass having working viscosities within a temperature and pressure range compatible with the disclosed blowing agents. Furthermore, it is not necessary that de-pressurization and cellulation be performed in contiguity with the fining cycle. The mixture of raw glass and blowing agent may be fused and fined, then cooled under pressure to solidity for ambient storage prior to cellulating.

In addition to the modifications of our preferred embodiment specified or implied above, it will be apparent to those of ordinary skill in the art that numerous other changes may be made without departure from the spirit of the invention or scope of the appended claims.

We claim as our invention:

1. A method of producing foamed glass of essentially uniformed cellulation comprising mixing raw glass constituents consisting of about 35% $B_2O_3$, 40% $SiO_2$, 25% $Na_2O$ with a small amount of blowing agent selected from the group consisting of barium and strontium carbonates, heating the mixture in a highly pressurized atmosphere containing $CO_2$, increasing the temperature and pressure on the mix and resulting melt so that the viscosity of the melt is kept between $10^4$ and $10^{10}$ poises; reducing the pressure to cause decomposition of the blowing agent so as to rapidly and uniformly generate gas and result in cellulation of the glass melt.

2. The method of claim 1 wherein the blowing agent is $SrCO_3$ and the temperature is between 400° C. and 900° C. and the pressure is above 1 atmosphere.

3. The method of claim 1 wherein the blowing agent is $BaCO_3$ and the temperature is between 900° C. and 1700° C. and the pressure is above 1 atmosphere.

References Cited

UNITED STATES PATENTS

| | | | |
|---|---|---|---|
| 2,322,581 | 6/1943 | Lytle | 65—22 |
| 2,978,340 | 4/1961 | Veatch et al. | 65—22 |
| 3,365,315 | 2/1968 | Beck et al. | 65—22 |

DONALL H. SYLVESTER, *Primary Examiner.*

E. R. FREEDMAN, *Assistant Examiner.*